Feb. 25, 1964

E. KRESTEL ET AL 3,122,659

SWITCHING DEVICE FOR DISCONNECTION OF A LOAD FROM A DIRECT-CURRENT SUPPLY

Filed Dec. 13, 1961

2 Sheets-Sheet 1

United States Patent Office 3,122,659 Patented Feb. 25, 1964

3,122,659

SWITCHING DEVICE FOR DISCONNECTION OF A LOAD FROM A DIRECT-CURRENT SUPPLY

Erich Krestel and Erich Rainer, both of Erlangen, Germany, assignors to Siemens-Schuckertwerke Aktiengesellschaft, Berlin-Siemensstadt, Germany, a corporation of Germany Filed Dec. 13, 1961, Ser. No. 159,103
Claims priority, application Germany Dec. 14, 1960
5 Claims. (Cl. 307—136)

Figure 1:
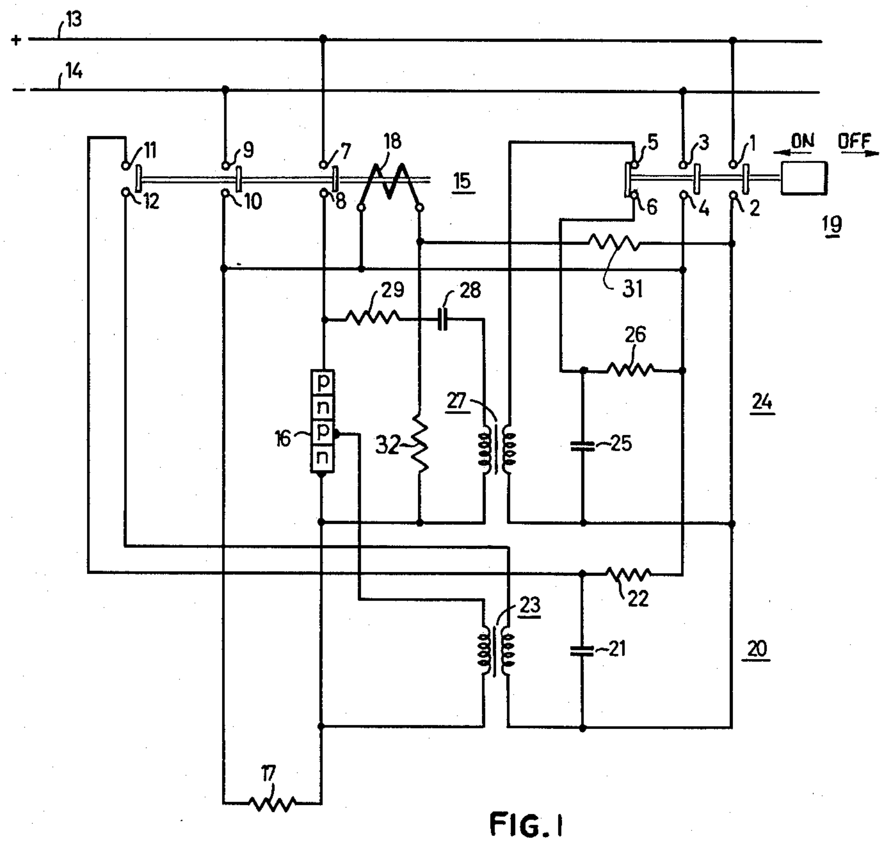

Our invention relates to direct-current switching circuits in which the commencement and termination of the load current is effected by semiconductor controllable devices such as silicon controlled rectifiers.

When disconnecting direct-current equipment under load by means of mechanical circuit breakers, the switch contacts are subjected to arcing. The considerable space requirements of such mechanical switches are greatly augmented by the auxiliaries needed for arc extinction. Nevertheless, thermal wear and damage at the switching contacts are inevitable so that the useful lifetime is notoriously limited.

In the general endeavor toward substituting mechanical switching contacts by contactless devices, it has repeatedly been proposed to utilize silicon controlled rectifiers and similarly controllable semiconductor devices for the disconnecting control of direct-current consumers under load. Such semiconductor devices have a performance comparable to that of thyratrons and other controllable gaseous electronic discharge devices of the switching type. As a rule, the semiconductor switching devices are designed as four-layer junction devices of the p-n-p-n or n-p-n-p type, having two terminal electrodes on the two outermost p-type and n-type layers and a control electrode, also called gate electrode or base electrode, at one of the intermediate layers. Such semiconductor devices, when impressed by a sufficient voltage across the two main electrodes, can be "closed" or "fired" by applying a firing pulse at the control electrode. However, they can be "opened" or "extinguished" only with the aid of an auxiliary extinguishing circuit capable of reducing the voltage between the main electrodes virtually to zero or to reverse the polarity of this voltage for a short interval of time.

Known devices for disconnection of direct-current power loads with the aid of such semiconductor controllable devices are therefore provided with an ignition control circuit and an auxiliary extinction control circuit which afford firing and extinguishing the device at any desired moments. The load to be controlled is connected in series with the semiconductor device directly to the buses of the direct-current supply line. Such a device permits avoiding any mechanical switching contacts in the power circuit.

In practical operation, however, devices of this type have left much to be desired and have exhibited severe disadvantages. Among these is the fact that semiconductor controllable devices continue conducting a certain amount of residual or "blocking" current when in blocked condition so that the load circuit is not separated from the direct-current supply line as regards electric potential. This may cause danger to operating personnel as well as disturbances in control and regulating circuits.

It is an object of our invention to combine the advantages of mechanical switching with those of semiconductor controlled switching and to thus provide an apparatus for disconnection of power loads from a direct-current supply with a minimum of expenditure as regards material, components and space requirements, while affording a greatly prolonged period of useful life as well as a reliable disconnection not only as to operating current but also relative to the line voltage.

To this end, and in accordance with a feature of our invention, we connect a semiconductor controllable device with a disconnect contactor of the mechanical type and interconnect the control circuit of the contactor with the semiconductor device by an interlocking circuit which controls the disconnect contactor to be actuated only when the semiconductor device is in blocking condition. The contacts of the disconnect contactor take care of completely separating the load circuit from the potential of the direct-current supply line. By virtue of the interlock connection, however, the disconnect contacts are called upon only to interrupt the extremely low blocking current of the semiconductor control device but do not ever act under load, so that the thermal wear imposed upon the contacts is negligibly small.

According to another feature of our invention the control coil means of the disconnect contactor are preferably connected parallel to the load and are also connected through the contacts of a control switch to the same direct-current line from which the load current is supplied. For disconnecting operation, the contacts of the control switch are opened so that the control coil means of the disconnect contactor remain only connected parallel to load energized by direct voltage from the current-supply line. As soon as thereafter the semiconductor control device is extinguished and has reduced the current to the residual blocking value, the disconnect contactor is deenergized and opens the load circuit, thus disconnecting the load from the potential of the supply line.

The above-mentioned and further objects, advantages and features of our invention, such features being set forth with particularity in the claims annexed hereto, will be apparent from, and will be described in the following with reference to the circuit diagrams of two embodiments of switching devices according to the invention illustrated by way of example in FIGS. 1 and 2 on the accompanying drawing, the same reference numerals being applied in both illustrations to corresponding components respectively.

Denoted by 13 and 14 are the buses of a direct-current supply line to which a current-consuming load 17 is connected in series with a p-n-p-n junction device 16, preferably a silicon controlled rectifier, and in series with the main contacts 7 and 9 of a disconnect contactor 15 which has an auxiliary contact 11 closing slightly subsequent to the closing of contacts 9 and 7. The operation of contactor 15 and of the semiconductor switching device 16 is primarily controlled by a switch 19 with two normally open contacts 2, 4 and a normally closed contact 6.

Figure 2:
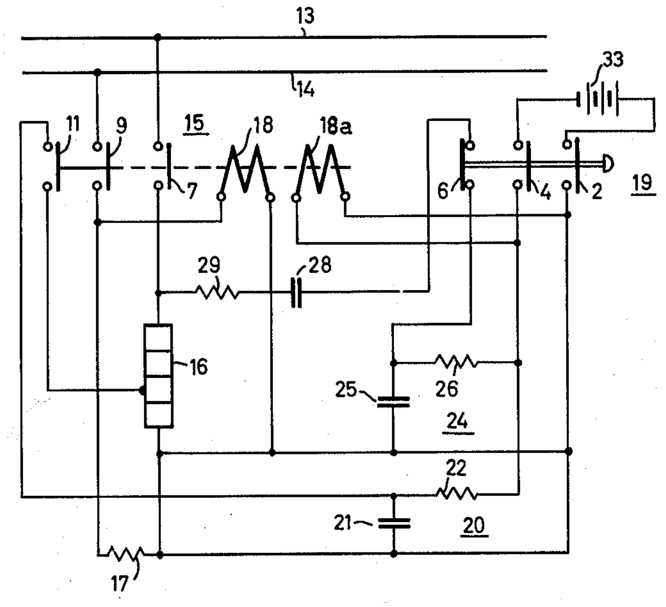

The control coil 18 of contactor 15 is connected parallel to the load 17 through a resistor 32 between the right-hand end of coil 18 (as seen in FIG. 1) and the right-hand end of load 17. Also coil 18 is connected through contacts 2 and 4 of the control switch 19 as well as through a resistor 31 to the buses 13, 14 of the direct-current line. The resistors 31 and 32 serve to prevent the potential of the bus 13 from appearing directly at the lower terminal electrode of semiconductor device 16. Contactor 15 and control switch 19 are shown in the respective positions that correspond to the "open" or "unfired" condition of the semiconductor device 16, in which condition the load 17 is traversed by full-rated direct current.

For controlling the semiconductor device 16, there are provided an ignition circuit 20 and an extinction circuit 24. The ignition circuit 20 comprises a capacitor 21 which is charged through a resistor 22 from the direct-current line, and a pulse transformer 23 which, when auxiliary contact 11 of the disconnect contactor 15 is closed, transmits the discharge impact current from capacitor 21 across the control path of the semiconductor device 16 to act as an ignition pulse. With line voltage previously applied across the terminal electrodes of the device 16, by closing of contacts 7 and 9, the device 16 is thus fired and thereafter continues passing rated current through the load circuit.

The extinction control circuit 24 also comprises a capacitor 25 which is charged from the direct-current line through a resistor 26. For extinguishing the semiconductor device 16, the control switch 19 is placed from "on" to "off" position so that contact 6 is closed, and the capacitor 25 is discharged through the primary winding of a pulse transformer 27 which transmits the pulse through a capacitor 28 and a resistor 29 across the main conductance path of the semiconductor device 16. The capacitor 28 serves exclusively for blocking the secondary winding of pulse transformer 27. The extinguishing pulse has the effect of temporarily diverting the load current from device 16 through the secondary winding of the pulse transformer 27 so that the semiconductor device 16 is momentarily relieved of terminal voltage and thus extinguished.

The performance of the direct-current switching device as a whole is as follows.

When the device is inactive and the load 17 disconnected from the line, the contacts of contactor 15 and those of control switch 19 are in the positions shown. For energizing the load 17, the control switch 19 is placed to the "on" position. This closes the charging circuits for capacitors 21, 25 and excites the control coil 18 of contactor 15. The contactor, upon lapse of its mechanical time delay, closes its main contacts 7, 9 and shortly thereafter actuates the auxiliary contact 11. Since at this time the semiconductor device is not yet fired, the contacts 7, 9 close virtually free of current-carrying duty and act only to apply line voltage across the semiconductor device 16. The charging of the capacitors is terminated prior to the closing of the contactor contacts. Hence, at the moment when the auxiliary contact 11 of contactor 15 closes, the ignition pulse from capacitor 21 passes through the transformer 23 to the control electrode of the semiconductor device 16 so that this device is now fired and commences conducting the load current.

For disconnecting the load 17 from the power supply, the control switch 19 is returned to the "off" position so that contacts 2, 4 are opened and contact 6 is closed. Contact 6 then passes an extinguishing pulse from capacitor 25 through pulse transformer 27, and the semiconductor device 16 is extinguished. Since the control coil 18 of contactor 15 is no longer connected with the power line through the contacts 4, 2 of the control switch 19, it is deenergized together with the load member 17. Consequently, the contactor 15 drops off and opens its main contacts 7, 9 at a time when the load current is already switched off by the semiconductor device 16. Thus, the contactor 15 separates the load circuit from the electric potential of the direct-current line while being subjected only to the residual amount of blocking current.

Such potential separation, however, can take place only when the semiconductor device 16 is actually extinguished. If, due to any operational disturbance, the extinguishing pulse was ineffective, then the control coil 18 remains energized because of its parallel connection to the load 17, and the attempt at extinction of the semiconductor device can be repeated by again actuating the control switch 19.

It will be understood that the ignition and extinction control circuits may be given various other designs. For example, the ignition and extinction energy may be supplied, not from the direct-current line energizing the load circuit, but from an auxiliary direct-current supply of approximately constant voltage in order to reliably secure proper switching of the load independently of voltage fluctuations in the direct-current line to which the load is connected. Instead of employing pulse transformers, the capacitors 21 and 25 may also be directly connected with the semiconductor controlled device, and it will be understood that the control switch 19 may be constituted by a relay operating in dependence upon control or regulating devices. As a result, the semiconductor controlled device 16 may be given for example the performance of a bi-stable switching or control member.

The embodiment shown in FIG. 2 incorporates the above-mentioned modifications, being otherwise designed and operative as described with reference to FIG. 1. The ignition control circuit 20 and the extinction control circuit 24 are directly connected to the semiconductor device and are both energized from a separate source 33 of substantially constant direct voltage. The embodiment of FIG. 2 further differs in that the resistors 31, 32 (FIG. 1) are no longer necessary by giving the contactor 15 two mutually insulated coils 18 and 18*a* (FIG. 2) which act cumulatively. Coil 18*a* is alone capable of causing the contactor to pick up, and coil 18 is alone capable of holding the contactor picked up if the load 17 is energized. Such and other modifications will be obvious to those skilled in the art, upon a study of this disclosure, and are indicative of the fact that the invention can be given embodiments other than particularly illustrated and described herein, without departing from the essential features of our invention and within the scope of the claims annexed hereto.

We claim:

1. Switching device for disconnection of a load from a direct-current supply, comprising direct-current line terminals, a load circuit connected between said terminals, a semiconductor controllable device of the four-layer type having two terminal electrodes and an intermediate control electrode, a contactor having contacts and control coil means for causing said contacts to open, said device having said main electrodes series-connected with said contacts in said load circuit, a firing circuit connected to said control electrode and one of said main electrodes for rendering said semiconductor device conductive when said contacts are closed, an extinguishing circuit connected between said main electrodes for controlling said semiconductor device to switch the direct current in said load circuit down to a residual blocking value, and circuit means connecting said control coil means across the load circuit for opening said contacts only upon reduction of the load current by said semiconductor device to said blocking value.

2. A switching device according to claim 1, comprising a resistive load member in said load circuit, a control switch and current supply means, said circuit means connected to said control coil means of said disconnect contactor having two circuit portions of which one is connected across said load member, said other circuit portion being connected through said control switch to said current supply means when said control switch is closed, whereby said contactor is caused to close said contacts upon closing of said switch and to open said contacts only when said semiconductor device is extinguished after opening of said switch.

3. Switching device for disconnection of a load from a direct-current supply, comprising direct-current line terminals, a load circuit connected between said terminals, a semi-conductor controllable device of the four-layer type having two terminal electrodes and an intermediate control electrode, a contactor having contacts and control coil means for causing said contacts to open, said device having said main electrodes series connected with said contacts in said load circuit, a firing circuit connected to said control electrode and one of said main electrodes for rendering said semi-conductor device conductive when said contacts are closed, an extinguishing circuit connected between said main electrodes for controlling said semi-conductor device to switch the direct current in said load circuit down to a residual blocking value, a resistive member in said load circuit, a control switch having an "on" position and an "off" position, current supply leads connected to said switch, said coil means comprising two coil-energizing circuits of which one is connected through said switch with said supply leads only when said switch is in the "on" position to then cause closing of said contactor contacts, said other energizing circuit being connected across said resistive member for holding said contacts closed until said semiconductor device is extinguished after said switch is placed from "on" to "off" position, said contactor having auxiliary contact means connected with said firing circuit for controlling it to fire said semiconductor device upon closing of said contacts, and said control switch having auxiliary contact means connected with said extinguishing circuit for controlling it to extinguish said semiconductor device when said switch is placed to "off" position.

4. In a switching device according to claim 3, said firing circuit and said extinguishing circuit having each a capacitor and a resistor connected in series with each other to said current supply leads through said control switch when said switch is closed, whereby said capacitors provide firing and extinguishing pulses respectively under control by said respective auxiliary contact means.

5. In a switching device according to claim 4, said disconnect contactors having a time constant of response larger than the charging time of said capacitors.

References Cited in the file of this patent

UNITED STATES PATENTS

| | | |
|---|---|---|
| 2,497,505 | Martin | Feb. 14, 1950 |
| 3,019,355 | Morgan | Jan. 30, 1962 |
| 3,040,270 | Gutzwiller | June 11, 1962 |

FOREIGN PATENTS

| | | |
|---|---|---|
| 735,053 | Great Britain | Aug. 10, 1955 |

OTHER REFERENCES

IBM Technical Disclosure Bulletin, vol. 2, No. 1, June 1959; page 26 (TK 7800–I13).

Notes on The Application of the SCR, G.E. Bulletin ECG 371 (TK 2798–G4c).